United States Patent [19]

Nagami

[11] Patent Number: 5,548,508

[45] Date of Patent: Aug. 20, 1996

[54] MACHINE TRANSLATION APPARATUS FOR TRANSLATING DOCUMENT WITH TAG

[75] Inventor: Wataru Nagami, Shizuoka, Japan

[73] Assignee: Fujitsu Limited, Kawasaki, Japan

[21] Appl. No.: 330,849

[22] Filed: Oct. 28, 1994

[30] Foreign Application Priority Data

Jan. 20, 1994 [JP] Japan ................... 6-004729

[51] Int. Cl.⁶ ............................... G06F 17/28
[52] U.S. Cl. .................. 364/419.02; 364/419.01
[58] Field of Search ............... 364/419.02, 419.01, 364/419.04, 419.08; 395/600

[56] References Cited

U.S. PATENT DOCUMENTS

| | | | |
|---|---|---|---|
| 4,641,264 | 2/1987 | Nitta et al. | 364/419 |
| 4,962,452 | 10/1990 | Nogami et al. | 364/419 |
| 5,140,521 | 8/1992 | Kozol et al. | 395/600 |
| 5,384,700 | 1/1995 | Lim et al. | 364/419.01 |

FOREIGN PATENT DOCUMENTS

| | | |
|---|---|---|
| 58-96372 | 6/1983 | Japan . |
| 60-124782 | 7/1985 | Japan . |
| 63-276174 | 11/1988 | Japan . |
| 63-316162 | 12/1988 | Japan . |
| 4-42362 | 2/1992 | Japan . |
| 04280369 | 10/1992 | Japan . |
| 0644296 | 2/1994 | Japan . |

*Primary Examiner*—Donald E. McElheny, Jr.
*Assistant Examiner*—Frantzy Poinvil
*Attorney, Agent, or Firm*—Armstrong, Westerman, Hattori, McLeland & Naughton

[57] ABSTRACT

A machine translation apparatus, for translating a document including at least one tag, has a definition file, a supplementary translation information adding unit, and a machine translation engine. The definition file converts the tag into supplementary translation information for a machine translation operation. The supplementary translation information adding unit adds the supplementary translation information to the document in accordance with the definition file. The machine translation engine carries out the machine translation operation by accepting the document having the supplementary translation information. Therefore, a precise translation can be carried out without using human knowledge or the common sense of an operator.

8 Claims, 4 Drawing Sheets

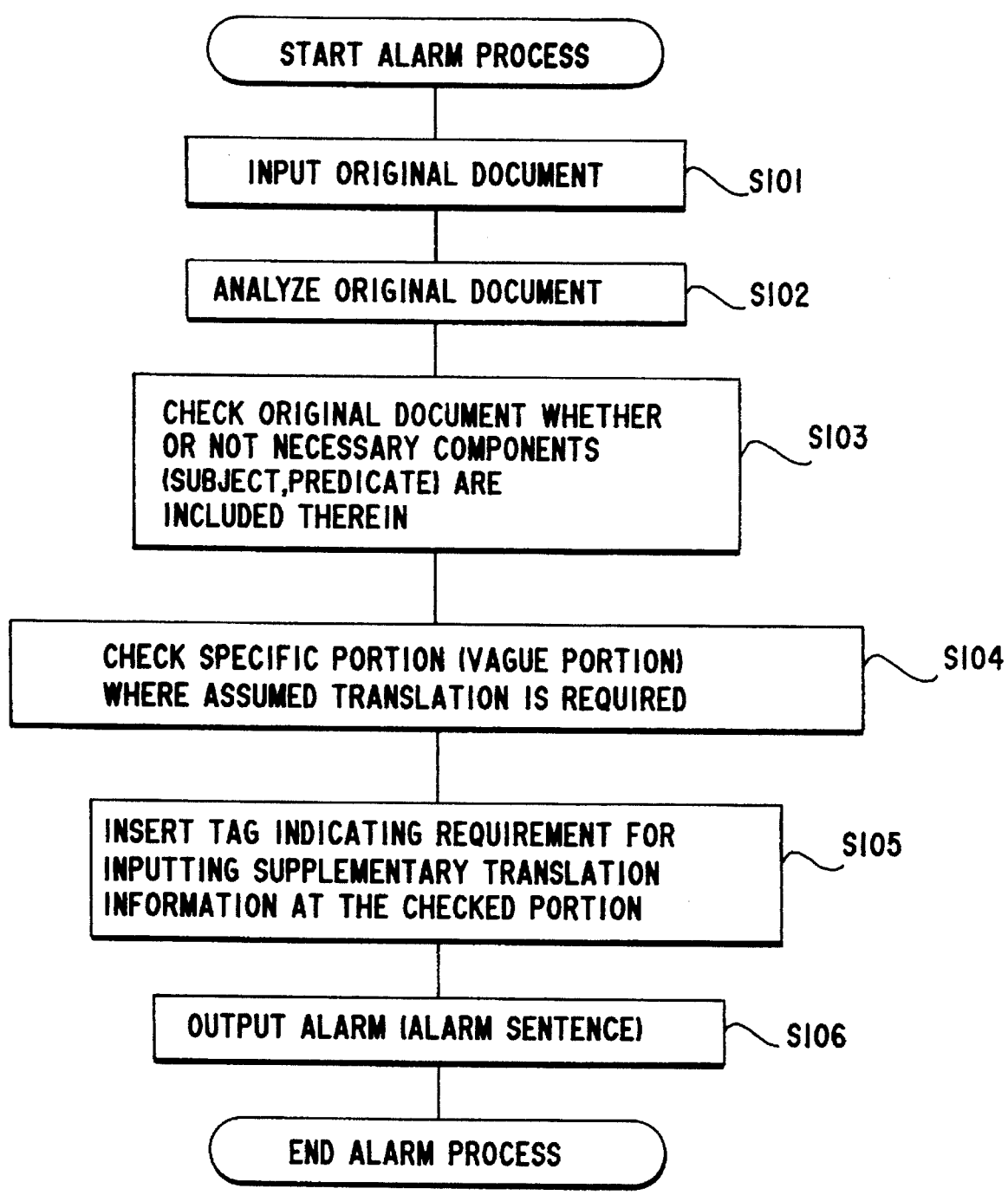

MACHINE TRANSLATION APPARATUS FOR TRANSLATING DOCUMENT WITH TAG

BACKGROUND OF THE INVENTION

1. Field of the Invention

The present invention relates to a machine translation apparatus, and more particularly, to a machine translation apparatus for translating a document with at least one tag.

2. Description of the Related Art

Recently, as a computer technology advances, machine translation apparatuses for automatically translating a document in a first language into a second language have been studied and developed. However, using the prior art machine translation apparatuses, it is difficult to analyze the construction of a document to be translated, and thus the prior art machine translation apparatuses can not be used in practice. Therefore, a machine translation apparatus able to carry out a precise translation is required.

Note that, the document (for example, a Japanese document) to be translated by the machine translation apparatus is determined to be an original document as it is, and thus, implicit or supplementary information concerning the document and a verbose description thereof necessary for the machine translation is omitted. Namely, the original document to be translated by the machine translation apparatus does not have sufficient description of information for carrying out a machine translation operation thereof. Therefore, when using a machine translation apparatus, an operator must add the above necessary description and information or analyze the meaning of the document in context.

In the prior art, a machine translation apparatus able to increase the accuracy and an efficiency of the translation process is, for example. provided by Japanese Unexamined Patent Publication (kokai) Nos. 60-124782, 63-276174, and 4-42362.

As described above, a translation based on human knowledge or the common sense can not be produced by current machine translation apparatuses. Current machine translation apparatuses translate a sentence only by using the included information thereof. Therefore, a machine translation apparatus carries out a translation operation in accordance with an original document (sentence) having vague portions, so that the machine translation apparatus can not correctly translate the document.

Further, in the proposed machine translation apparatuses, the translation efficiency is not sufficient. Namely, for example, in the machine translation apparatus disclosed in Japanese Unexamined Patent Publication (Kokai) No. 60-124782, a standard document form, which can be recognized (understood) by the machine translation apparatus, is constituted based on the document form of the original document. Further, in a machine translation system disclosed in Japanese Unexamined Patent Publication (Kokai) No. 63-276174, the supplementary translation information is not always used, and further, this supplementary translation information should be input to the machine translation apparatus by dialogue with the operation. Further, in a method of processing Japanese documents disclosed in Japanese Unexamined Patent Publication (Kokai) No. 4-42362, when a subject or predicate is omitted, the omitted subject or predicate is provided by using a candidate buffer.

SUMMARY OF THE INVENTION

An object of the present invention is to provide a machine translation apparatus able to carry out a translation, with high accuracy, without requiring human knowledge or the common sense of the operator using the machine translation apparatus.

According to the present invention, there is provided a machine translation apparatus for translating a document including at least one tag, wherein the machine translation apparatus comprises a definition file for converting the tag into supplementary translation information for a machine translation operation; a supplementary translation information adding unit for adding the supplementary translation information for the tag, into the document in accordance with the definition file; and a machine translation engine for carrying out the machine translation operation after accepting the document having the supplementary translation information.

The document to be translated may be a standard general markup language document including at least one tag, and the standard general markup language document may be translated by converting the tag thereof into supplementary translation information. The machine translation apparatus may translate the standard general markup language document written in a first language and outputs a translated standard general markup language document written in a second language.

The machine translation apparatus may further comprise an alarm function unit for detecting a portion of the document to be translated where supplementary translation information is required, and for carrying out an alarm process by adding a specific tag to the detected portion of the document.

Further, according to the present invention, there is also provided a machine translation apparatus for translating a document including at least one tag, wherein the machine translation apparatus comprises an original document reading unit for reading an original document to be translated; a pre-processing unit for carrying out a pre-process for a machine translation operation by converting the tag of the original document to supplementary translation information which can be recognized by the machine translation apparatus, or by deleting the tag from the original document; a machine translation performing unit for translating the original document, having the supplementary translation information, by referring to an exclusive dictionary file and an exclusive grammar file; and a post-processing unit for carrying out a post-process of the machine translation operation by adding another tag corresponding to the tag of the original document to a translated document in accordance with a requirement.

The document to be translated may be a standard general markup language document including at least one tag, and the standard general markup language document may be translated by converting the tag thereof into supplementary translation information. The machine translation apparatus may translate the standard general markup language document written in a first language and outputs a translated standard general markup language document written in a second language.

The machine translation apparatus may further comprise an alarm function unit for detecting any portion of the document to be translated where supplementary translation information is required, and for carrying out an alarm process by adding a specific tag to the detected portion of the document; and the document having the specific tag added by the alarm function unit is read by the original document reading unit.

BRIEF DESCRIPTION OF THE DRAWINGS

The present invention will be more clearly understood from the description of the preferred embodiments as set forth below with reference to the accompanying drawings, wherein:

FIG. 4 is a flowchart showing an example of an alarm process of a machine translation apparatus according to the present invention.

DESCRIPTION OF THE PREFERRED EMBODIMENTS

Below, the embodiments of a machine translation apparatus according to the present invention will be explained with reference to the accompanying drawings.

Figure 1:
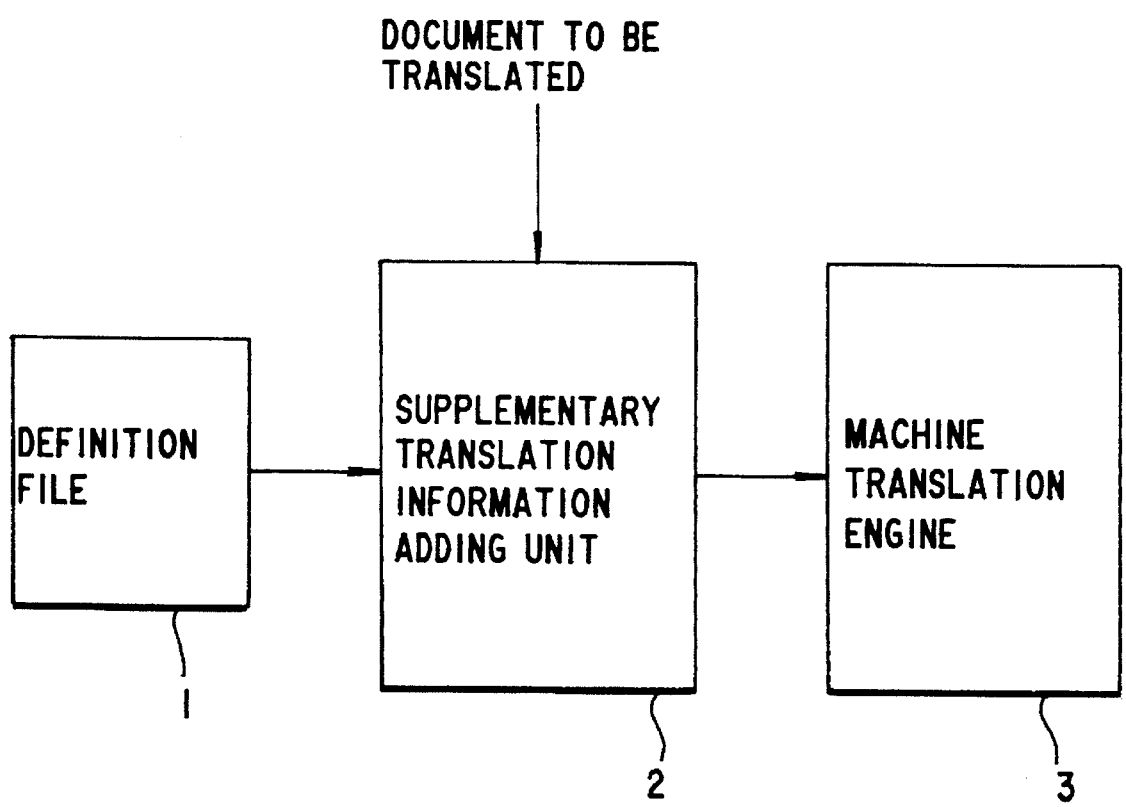
FIG. 1 is a diagram schematically showing a principle configuration of a machine translation apparatus according to the present invention.

FIG. 1 schematically shows a principle configuration of a machine translation apparatus according to the present invention. In FIG. 1, reference numeral 1 denotes definition file, 2 denotes a supplementary translation information adding unit, and 3 denotes a machine translation engine.

The machine translation apparatus is used to translate a document including at least one tag. The definition file 1 converts the tag into supplementary information for a machine translation, and the supplementary translation information adding unit 2 adds the supplementary information of the tag to the document in accordance with the definition file 1. The machine translation engine 3 carries out the machine translation operation after accepting the document having supplementary translation information.

Note that, the document including the tag to be translated by the machine translation apparatus of the present invention is, for example, a document described by a Standard General Markup Language (SGML) document.

The SGML was defined by ISO 8879 as an exchange-form of a document by the International Standardization Organization (ISO) in 1986, and further, this ISO 8879 was included in JIS X4151-1992 in Japan in 1992. Namely, SGML is used for personal computers (PCs), wordprocessors (WPs), and the like, so as to easy modification or processing of the document translated (or decoded) into electrical codes. Note that, in SGML, the document includes at least one tag which indicates the configuration of the document, and the document configuration is described as a standard form.

When using SGML, a user (operator) can understand the contents and configuration of the document by an external appearance (positional characteristics) of the document. Further, in SGML, a user (creator) can draw up a document by dividing the contents of the document and the form thereof, and thus, when a document is made by a plurality of persons, the document can be made to conform to a specific standard document form.

Figure 2:
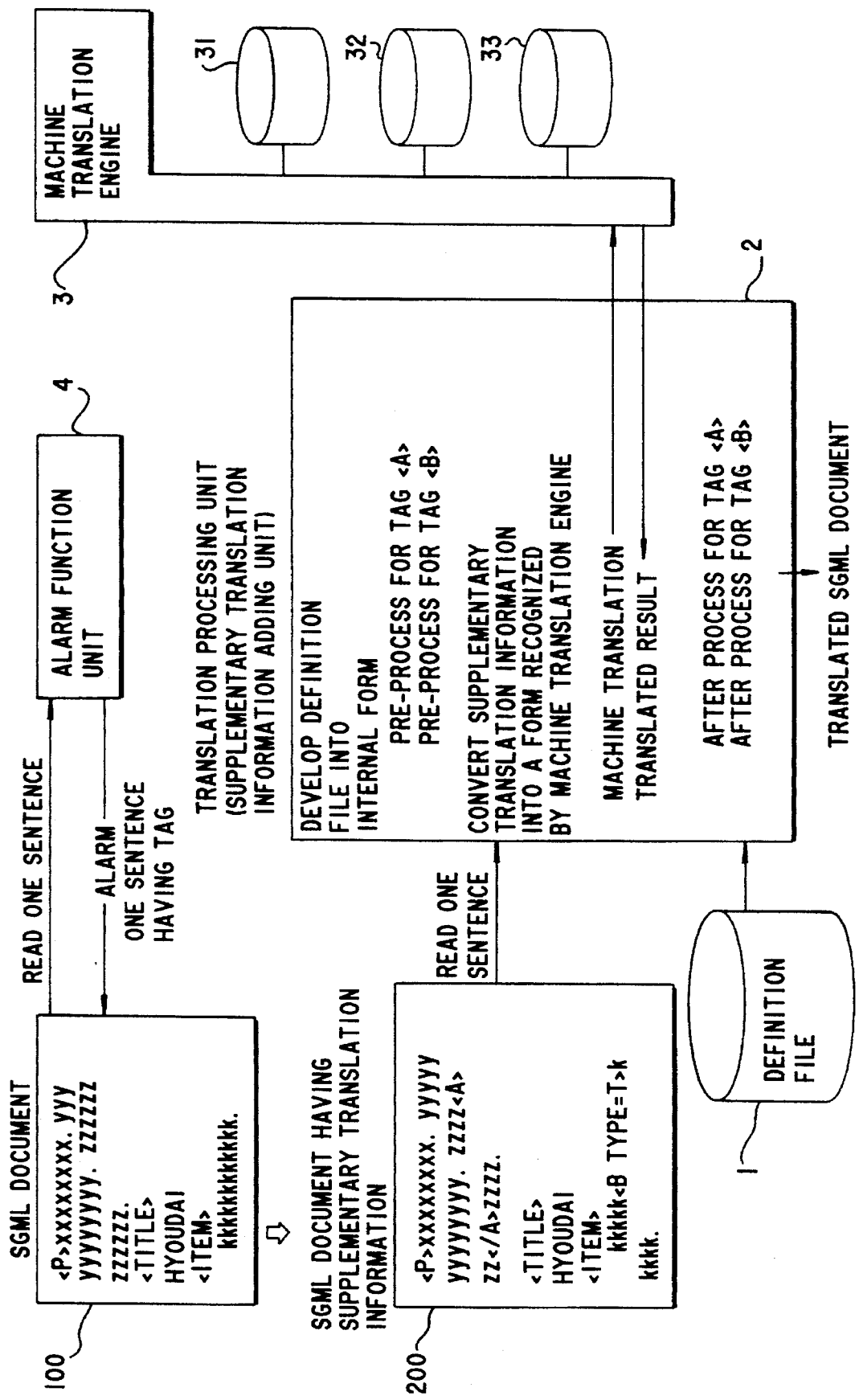
FIG. 2 is a block diagram showing an embodiment of a machine translation apparatus according to the present invention.

FIG. 2 shows an embodiment of a machine translation apparatus according to the present invention. In FIG. 2, 100 denotes a SGML document to be translated by the machine translation apparatus, 200 denotes a SGML document having supplementary translation information which will be described later. Further, reference numeral 1 denotes a definition file, 2 denotes a translation processing unit (supplementary translation information adding unit), 3 denotes a machine translation engine, and 4 denotes an alarm function unit.

The definition file 1 is used to convert a tag on the SGML document (200) into supplementary information for a machine translation operation, and the translation processing unit 2 is used to add the supplementary information from the tag to the document in accordance with the definition file 1. Further, the machine translation engine 3 is used to carry out the machine translation operation by accepting the document containing the supplementary translation information processed by the translation processing unit 2.

Figure 3:
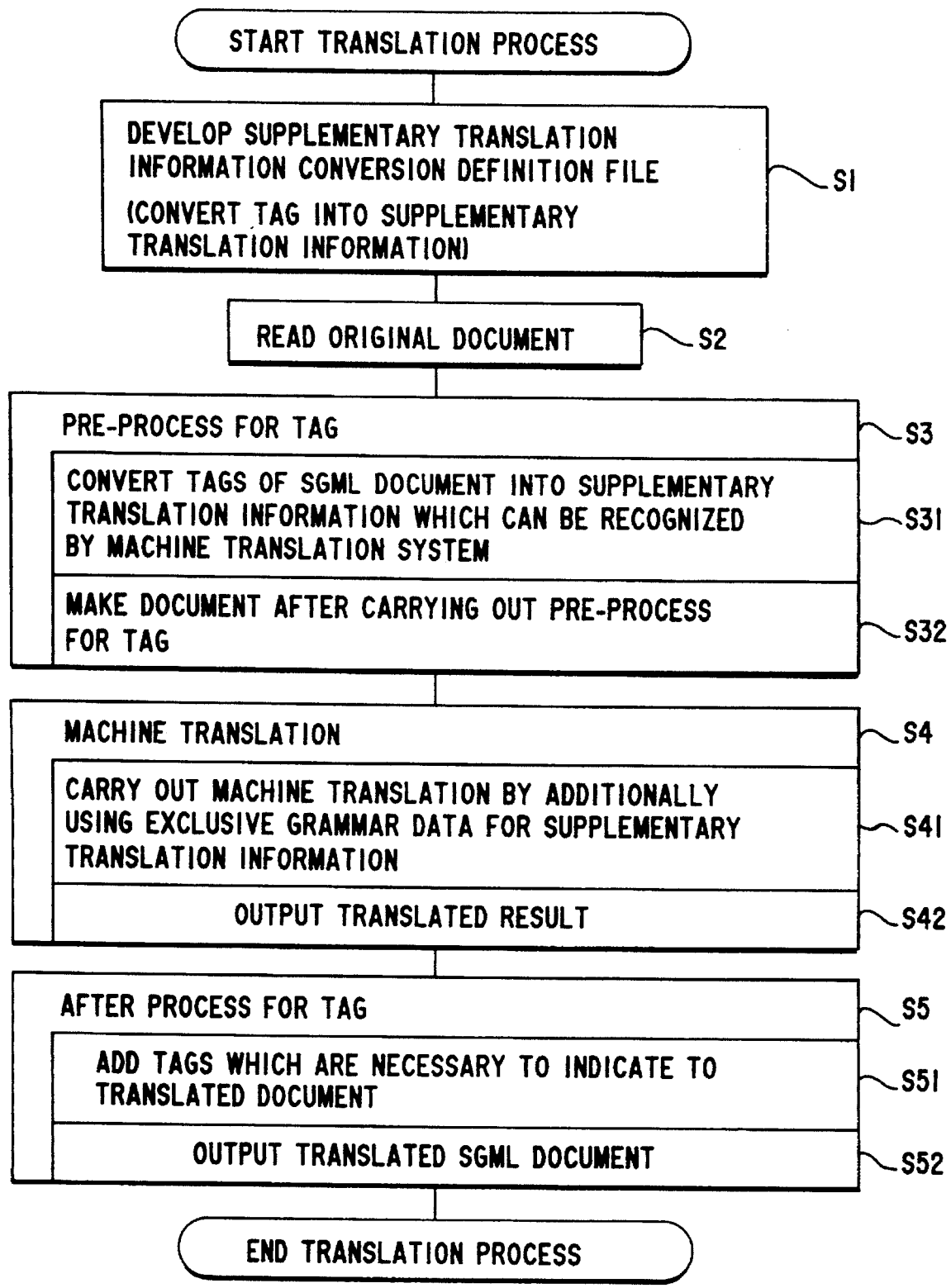
FIG. 3 is a flowchart showing an example of overall processes of a machine translation apparatus according to the present invention.

The SGML document 100 has a plurality of tags indicating format information, comment, supplementary words, and the like. In the SGML document 100 shown in FIG. 2, for example, reference "<P>" denotes a tag for indicating paragraphs, "<TITLE>" denotes a tag for indicating the title, and <ITEM> denotes a tag for indicating an item. This SGML document 100 is input into the alarm function unit 4, and an alarm process, which will be explained with reference to FIGS. 3 and 4, is carried out in the alarm function unit 4, so that supplementary translation information is added to the SGML document.

Namely, the SGML document 100 is exchanged to a SGML document 200 which has supplementary translation information added by the alarm function unit 4. Further, each sentence of the SGML document 200 is read, in order, into the translation processing unit 2, and a machine translation process for each sentence is carried out in the alarm function unit 4 by using the definition file 1 and the machine translation engine 3, which will be explained later with reference to FIG. 3, and first and second example documents (sentences). Note that, in the SGML document shown in FIG. 2, "<A>", "<B>", and "<B TYPE=T>" denote tags for indicating supplementary translation information added by the alarm function unit 4.

As shown in FIG. 2, the machine translation engine 3 carries out a machine translation for translating a first document written in a first language (for example, a document written in Japanese) to a second document written in a second language (for example, a document written in English) by using dictionary data 31, grammar data 32, and exclusive grammar data 33 as supplementary translation information.

Below, a translation process and an alarm process are explained with reference to first to third example sentences.

First, an example of an overall process of the machine translation apparatus according to the present invention will be explained with reference to a general document (statement) and an SGML document of a first example sentence "コンピュータ(computer)の開発(development)と歴史(history)".

[GENERAL DOCUMENT]

『コンピュータの開発と歴史』

First, in this general document, it is not clear whether only the word "開発(development)" depends on the word "コンピュータ(computer)", or whether both words "開発(development)" and "歴史(history)" depend on the word "コンピュータ(computer)".

Namely, when translating the above Japanese document into an English document, it is not clear whether the above Japanese document should be translated as "Development of a computer and history" or "Development and history of a computer".

[SGML DOCUMENT]

「コンピュータの<MODIFY>開発と歴史</MODIFY>」

On the other hand, in the above SGML document, the tags "<MODIFY>" and "</MODIFY>" are converted into supplementary translation information in accordance with the definition file 1. Concretely, the words "開発(development)" and "歴史(history)", which are positioned between the tags "<MODIFY>" and "</MODIFY>", are determined as both words "開発(development)" and "歴史(history)" depend on the word "コンピュータ(computer)", since the words between the tags "<MODIFY>" and "</MODIFY>" are determined to be dependent words. Therefore, the above SGML document is exactly translated as "Development and history of a computer".

Note that, the translated document (English document) can be described as an SGML document including tags. Namely, the translated document "Development and history of a computer" can be described as "<MODIFY>Development and history</MODIFY> of a computer". These tags "<MODIFY>" and "</MODIFY>" can be eliminated when printing the translated document.

FIG. 3 is a flowchart showing an example of overall processes of a machine translation apparatus according to the present invention.

As shown in FIG. 3, when starting translation process, in Step 1, a supplementary translation information conversion definition file (definition file), which convert tags into supplementary information (supplementary translation information) for the machine translation, is developed to an internal form. The following table 1 denotes examples of the supplementary translation information conversion definition file (definition file) for converting the tag (tags) into supplementary translation information.

TABLE 1

| TAG | MEANING | AFTER PROCESS FOR TAG |
| --- | --- | --- |
| <MODIFY> | TRANS-PARALLEL | REMAIN AFTER TRANSLATION |
| <INDEX> | TRANS-KEYWORD | REMAIN AFTER TRANSLATION |

Next the flow proceeds to Step 2 where an original document is read, and further, in Step 3, a pre-process for tags (first process for processing the tags) is carried out. In Step 2, the original document to be read by the translation processing unit 2 is, for example, an SGML document. Concretely, this SGML document is, for example, the above described SGML document (statement) "コンピュータの<MODIFY>開発と歴史</MODIFY>".

As shown in FIG. 3, Step 3 includes steps 31 and 32. In Step 31, the tags for the SGML document are converted into supplementary translation information which can be recognized by the machine translation system (machine translation engine), and further, the tags may be eliminated. Further, in Step 32, a document after carrying out the pre-process for the tags is made by the machine translation apparatus.

Further, the flow proceeds to Step 4, where a first document written in a first language (for example, a document written in Japanese) is translated to a second document written in a second language (for example, a document written in English) by the machine translation engine 3.

As shown in FIG. 3, Step 4 includes Steps 41 and 42. In Step 41, for example, a Japanese document is translated into an English document by the machine translation engine 3 by using dictionary data 31, grammar data 32, and exclusive grammar data 33 for the supplementary translation information. Namely, the exclusive grammar data 33 for the supplementary translation information is additionally provided to a general machine translation apparatus which has dictionary data and grammar data. Further, in Step 42, the translated result (the translated English document) is output.

Further, the flow proceeds to Step 5 including Steps 51 and 52, wherein, an after process for the tag is carried out. Namely, in Step 51, the tags which are necessary in the translated document are added to the translated document, and in Step 52, the translated SGML document including the tags is output.

Next, a machine translation process of the machine translation apparatus according to the present invention will be explained by comparing a general document with an SGML document of a second example "印刷(print)はプリントステーション(print station)を利用する(use)".

[GENERAL DOCUMENT]

「印刷はプリントステーションを利用する」

First, in this general document, it is possible to translate "印刷(print)" and "利用する(use). Namely, when translating the above Japanese document into an English document, the Japanese document may be translated as "The print uses the print station."

[SGML DOCUMENT]

「印刷は<RELATE TYPE=PURPOSE>
プリントステーションを利用する。」

On the other hand, in the above SGML document, a tag "<RELATE TYPE=PURPOSE>" is converted into supplementary translation information in accordance with the definition file 1. Concretely, the words "印刷(print)", which is positioned just before the tag "<RELATE TYPE=PURPOSE>", is determined as an object of the word "利用する(use), and the above SGML document is translated indicating that "プリントステーションを利(print station)" "利用する (use)" for the purpose of "印刷(print)". Namely, the SGML document is translated as "The print station is used to print."

Note that, similar to the above described first example, the translated document (English document) can be described as an SGML document including tags. Namely, the translated document "The print station is used to print." can be described as "<RELATE TYPE=PURPOSE>The print station is used to print." This tag "<RELATE TYPE=PURPOSE>" can be eliminated when printing the translated document.

Further, an alarm process of the machine translation apparatus according to the present invention will be explained by comparing a general document with an SGML document of "ＡＢＣシステム(ABC system) は、文書処理(document processing)に威力(power) を発揮する(display)である。特徴(system) である。特徴(characteristics)は、以下のものである(as follows) システ•文書管理(document management) を容易を容易 (make easy)。•文書印刷 (document printing) を高速に(speedy) 処理する(carry out)。大量文書 (a large quantity of)から高速(high speed)検索する (search)システ" Note that, the alarm process is carried out to require an input for supplementary translation information at a position where a word (words) are eliminated by avoiding a verbose expression, and the like.

[GENERAL DOCUMENT]

「ABCシステムは、文書処理に威力を発揮するシステムである。特徴は、以下のものである。
・文書管理を容易にする。
・文書印刷を高速に処理する。
・大量文書から高速検索する。」

[RESULT OF ALARM PROCESS]

「ABCシステムは①<RELATE TYPE=SUBJ>、文書処理に威力を発揮するシステムである。
②<CONCERN></CONCERN>特徴は③<RELATE TYPE=SUBJ>Ω以下の以下のある。
•④<SUBJ></SUBJ>ある。理を容易にする。
•<SUBJ></SUBJ>文書印刷を高速に処理する。
•<SUBJ></SUBJ>大量文書から高速検索する。」

Note that, ① "<RELATE TYPE=SUBJ>" in the document "ABCシステムは<RELATE TYPE=SUBJ>、" indicates a demand for detailed information for the Japanese postpositional particle "は". Further, ② "<CONCERN></CONCERN>" in the document "<CONCERN></CONCERN>特徴は<RELATE TYPE=SUBJ>、" indicates a demand for a relationship of "特徴(characteristics)", and ③ "<RELATE TYPE=SUBJ>" in the document "<CONCERN></CONCERN> 特徴は<RELATE TYPE=SUBJ>Ω" indicates a demand for detailed information for a Japanese postpositional particle "は". In addition, ④ "<SUBJ></SUBJ>" in the document "<SUBJ></SUBJ> 文書管理を容易にする。", and the like, indicates a demand for the subject of the document, since the subject is omitted therefrom.

[DOCUMENT INCLUDING SUPPLEMENTARY TRANSLATION INFORMATION ADDED IN ACCORDANCE WITH THE OUTPUT OF THE ALARM PROCESS: INPUT DOCUMENT FOR MACHINE TRANSLATION]

「A B Cシステムは①<RELATETYPE=SUBJ>、文書処理に威力を発揮するシステムである。
②<CONCERN>ABCシステム</CONCERN> 特徴は③としては以下のものである。
•④<SUBJ>ABCシステム</SUBJ>
   文書管理を容易にする。
•<SUBJ>ABCシステム</SUBJ>
   文書印刷を高速に処理する、
•<SUBJ>ABCシステム</SUBJ>
   大量文書から高速検索する。」

Note that, there is not necessary for ① "<RELATE TYPE=SUBJ>" in the document "A B C システムは<RELATE TYPE=SUBJ>、" to modify the document, since a postpositional particle of Japanese "は" indicates a subject of the document. Further, ② "<CONCERN> A B C システム</CONCERN>" in the document "<CONCERN> A B C システムシステ</CONCERN> 特徴は<RELATE TYPE=SUBJ>、" clarifies the relation concerning to "A B C システム", and the postpositional particle of Japanese "は" is modified to ③ "としては". In addition, ④ "<SUBJ> A B C システム</SUBJ>" in the document "<SUBJ> A B C システム</SUBJ> 文書管理を容易にする。", and the like, clarifies that the subject is "A B C システム".

FIG. 4 is a flowchart showing an example of an alarm process of a machine translation apparatus according to the present invention.

When starting an alarm process, in Step S101, an original document is input into the alarm function unit (4), and in Step S102, the input document is analyzed. Next, in Step S103, wherein the original document is checked to determine whether or not the original document includes necessary components (for example, subject, object, and the like), and the flow proceeds to Step S104.

In Step S104, a specific portion, where an assumed translation operation of the machine translation is required or where vagueness exists, is checked. Further, in Step S105, a tag, which indicates the requirement for inputting supplementary translation information, is inserted at the checked portion (vague portion), and the flow proceeds to Step S106.

In Step S106, an alarm document (a document including a tag for requiring input of supplementary translation information) is output. Note that, the process carried out in Steps S103 and S105 corresponds to the process of inserting "<SUBJ></SUBJ>" into the document "<SUBJ></SUBJ> 文書管理を容易にする。" of the above explained third example document. Further, the process carried out in Steps S104 and S105 corresponds to the process of inserting "<RELATE TYPE=SUBJ>" into the document "A B C システムは <RELATE TYPE=SUBJ>、文書処理に威力を発揮するシステムである。" of the above explained third example document.

As described above, according to the embodiments of the present invention, a writer (operator) can freely describe a document, for example, by omitting verbose words or terms which are generally omitted in a normal document. Further, the operator can directly describe the supplementary translation information for carrying out the machine translation (machine translation engine) into the document. Namely, a language substantially corresponding to a programming language can be defined for the machine translation engine, and an accurate document (data) can be input to the machine translation engine, so that the original document (for example, a Japanese document) can be translated into another language document) for example, English document) with high accuracy. Further, the machine translation can be quickly carried out. In addition, the original document and the translated document can be uniformly managed.

Note that, in the above descriptions, a first language document to be translated is determined to be a Japanese documenty, and a second language document, which is a translated document, is determined to be an English document, but these first and second language document are not limited to Japanese and English document. Namely, a machine translation apparatus according to the present invention can not only be applied to a machine translation from Japanese to English, but can also be applied to machine translation between other languages.

Consequently, according to a machine translation apparatus of the present invention, by adding a tag to a document as supplementary translation information and then by carrying out a translation operation, a precise translation can be carried out without requiring human knowledge or the common sense of an operator.

Many different embodiments of the present invention may be constructed without departing from the spirit and scope of the present invention, and it should be understood that the present invention is not limited to the specific embodiments described in this specification, except as defined in the appended claims.

What is claimed is:

1. A machine translation apparatus for translating a document including at least one tag, said machine translation apparatus comprising:

a definition file for converting said tag into supplementary translation information for a machine translation a supplementary translation information adding means, operably connected to said definition file, for adding the supplementary translation information for said tag into said document in accordance with said definition file; and a machine translation engine, operably connected to said supplementary translation information adding means, for carrying out the machine translation operation after accepting said document having the supplementary translation information, said supplementary translation information, which has been converted from said tag, being recognizable by said machine translation engine for carrying out said machine translation operation.

2. A machine translation apparatus as claimed in claim 1, wherein said document to be translated is a standard general markup language document including at least one tag, and said standard general markup language document is translated by converting said tag thereof into supplementary translation information.

3. A machine translation apparatus as claimed in claim 2, wherein said machine translation apparatus translates said standard general markup language document written in a first language and outputs a translated standard general markup language document written in a second language.

4. A machine translation apparatus as claimed in claim 1, wherein said machine translation apparatus further comprises an alarm function unit for detecting a portion of said document to be translated where supplementary translation information is required, and for carrying out an alarm process by adding a specific tag to said detected portion of said document.

5. A machine translation apparatus for translating a document including at least one tag, said machine translation apparatus comprising:

an original document reading means for reading an original document to be translated;

a pre-processing means, operably coupled to said original document reading means, for carrying out a pre-process for a machine translation operation by converting said tag of said original document to supplementary translation information which can be recognized by said machine translation apparatus, or by deleting said tag from said original document;

a machine translation performing means, operably coupled to said pre-processing means, for translating said original document, having the supplementary translation information, by referring to an exclusive dictionary file and an exclusive grammar file; and a post-processing means, operably coupled to said machine translation performing means, for carrying out a post-process of said machine translation operation by adding another tag corresponding to said tag of said original document to a translated document in accordance with a requirement.

6. A machine translation apparatus as claimed in claim 5, wherein said document to be translated is a standard general markup language document including at least one tag, and said standard general markup language document is translated by converting said tag thereof into supplementary translation information.

7. A machine translation apparatus as claimed in claim 6, wherein said machine translation apparatus translates said standard general markup language document written in a first language and outputs a translated standard general markup language document written in a second language.

8. A machine translation apparatus as claimed in claim 5, wherein said machine translation apparatus further comprises an alarm function unit for detecting any portion of said document to be translated where supplementary translation information is required, and for carrying out an alarm process by adding a specific tag to said detected portion of said document; and the document having the specific tag added by said alarm function unit is read by said original document reading means.

* * * * *